Figure 1:
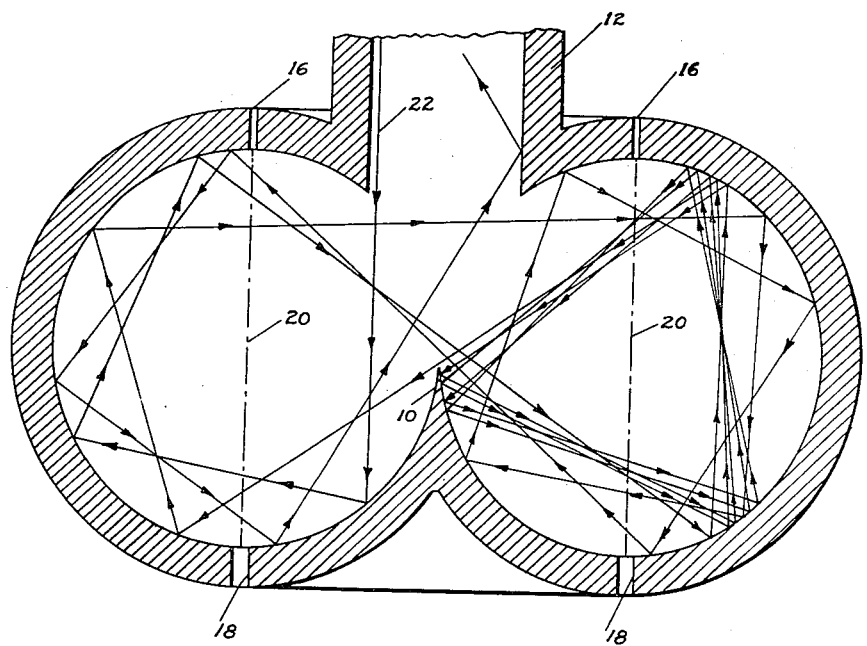

Aug. 31, 1948.  C. B. HORSLEY  2,448,372
PROCESS OF TREATMENT BY COMPRESSION WAVES
Filed Feb. 7, 1946

INVENTOR
Caperton B. Horsley
BY
Henway & Witter
ATTORNEY

Patented Aug. 31, 1948

2,448,372

UNITED STATES PATENT OFFICE 2,448,372

PROCESS OF TREATMENT BY COMPRESSION WAVES

Caperton B. Horsley, Stamford, Conn., assignor to Ultrasonic Corporation, Boston, Mass., a corporation of Massachusetts Application February 7, 1946, Serial No. 646,178

7 Claims. (Cl. 259—1)

My invention relates to the art of treating materials with compression waves.

Compression waves partake of the nature of sound waves in that they comprise alternate series of positive and negative pressure regions travelling through a material. However, my invention contemplates the employment of waves of ultrasonic as well as audible frequencies, or combinations thereof.

There are many fields in which my novel process can be used. Among them are the sterilization of liquids such as milk, the destruction of organisms in solid materials such as flour, the emulsification of oils and water, the agglomeration of small particles in aerosols, the homogenization of milk, and an agglomeration of oil globules suspended in water. These are but a few examples of the tremendous number of applications of compression wave treatment in industry.

An important factor in the degree of modification of the material, or the effectiveness of the treatment, is the peak acceleration achieved by the particles composing or contained in the material being treated. Of course, other factors also determine the efficiency of a given operation. Heretofore it has been customary to generate compression waves in the material to be treated in view of difficulties encountered in the transmission of compression waves to a liquid or solid from a gaseous medium. The principal difficulty has been that the liquid or solid will reflect nearly 100% of the compression waves directed against its surface. Furthermore it has been found almost impossible to produce in the material itself compression waves having energies or pressure amplitudes high enough to do useful work on a commercial scale. I have discovered a method of compression wave treatment in which waves generated in a gaseous medium at high energies are transmitted through a fluent material to be treated without significant losses due to reflection from the surface of the material undergoing treatment.

The most important object of my invention is to improve the efficiency with which compression waves may be transmitted from a gaseous medium to a liquid or solids in powder form. Another object of my invention is to increase the acceleration of particles of a fluent material exposed to the action of compression waves.

The most important feature of my invention resides in a method of treating fluent materials with compression waves, in which the material to be treated is formed as a thin flowing curtain having a thickness so related to the wave length of the compression waves used in the process that the acceleration of particles of the material reaches a magnitude at which the desired modification of the material takes place with high efficiency.

Figure 2:
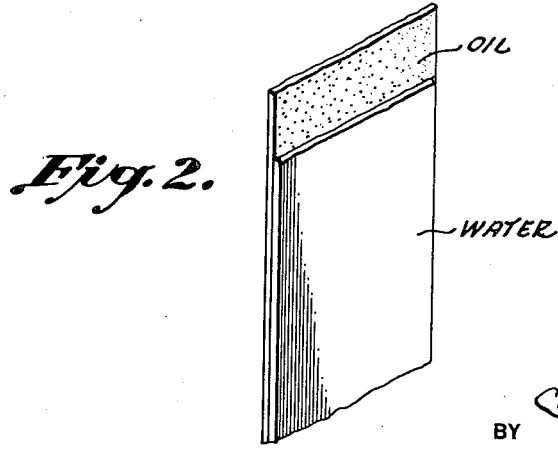

These and other objects and features of my invention will be more readily understood and appreciated from the following detailed description of a preferred manner of putting it into practice selected for purposes of illustration and shown in the accompanying drawing, in which:

Fig. 1 is a diagrammatic view in cross section through an acoustic chamber in which the process of my invention may conveniently be carried out, and Fig. 2 is a cross section through a greatly magnified laminar liquid curtain.

Although it has been found easier to generate compression waves at relatively high pressure amplitudes and frequencies in a gas than in a liquid or solid, it has not been considered possible to transmit the compression waves so formed to a liquid since the surface of the liquid reflects nearly 100% of the compression waves back into the gas. The following discussion will illustrate some of the factors involved.

For example, assume that we have generated free plane progressive compression waves in air at atmospheric pressure, at 20° C., at 10,000 cycles per second, and with an intensity of one watt per square centimeter. Under these conditions the peak acceleration of any portion or particle of the air traversed by the waves will approximate 1,440,000' per second per second, or 45,000 G. For compression waves generated in water at 10,000 cycles per second at an intensity of one watt per square centimeter, the peak acceleration of the water particles would be only 750 G. This compression demonstrates the enormous increase in particle acceleration when the waves are generated in a gas instead of in water or comparable liquid. However, if the compression waves generated in air under the above conditions were directed against a considerable body of water, the peak acceleration of the particles in the water would be only about 12 G. in view of the fact that the greater part of the energy is reflected by the surface of the water.

I have discovered, however, that by directing the compression waves against a thin curtain of water instead of a body thereof, the acceleration of the water particles can be enormously increased. If the thickness of the curtain is such that the mass of water to be moved does not greatly exceed the mass of air being moved by each wave front, the acceleration of the water particles will be almost as great as the acceleration of the air particles, 45,000 G. under the conditions described above. The thin curtain will act as a diaphragm set in motion by the compression waves.

The mass of air which is moved by a compression wave traveling through it is roughly equivalent to a column of air having the cross section equal to that covered by the wave front and a depth equal to one quarter of the wave length of the compression wave. At 10,000 cycles per second the wave length in air is 1.36", a quarter wave length being .34". A column of air having a cross-sectional area of one square inch and a depth of .34" weighs approximately .000016 lb. A column of water having a cross-sectional area of one square inch and a like weight will have a depth, or thickness, of .0005". Accordingly when, in accordance with my invention, a flowing curtain of liquid having a thickness of .0005" is bombarded with compression waves at 10,000 cycles per second and an intensity of one watt per square centimeter, the water particles will exhibit a peak acceleration approaching that of the air particles, that is 45,000 G.

The figures and values used herein are believed to be substantially accurate and reflect careful calculation. However, they have been selected for inclusion in the discussion more particularly to illustrate relative differences and comparative results under various conditions of operation and treatment.

Various considerations such as the nature and the amount of a liquid to be treated in a given time, may make it desirable to use curtains of greater thickness. As the thickness of the curtain increases from the optimum thickness, the particle acceleration obtained within the curtain will decrease, and the decrease in acceleration is roughly proportional to the increase in curtain thickness. However, useful results may still be obtained with curtains of much greater thickness. For example, under the above conditions the acceleration in a curtain .005" thick would approximate 4,000 G., 800 G. for a curtain .25" thick, and 200 G. for a curtain .10" thick.

It will now be apparent that, under the conditions described, when the curtain is .025" thick, the particle acceleration is about the same as would be the case if a compression wave having an intensity of one watt per square centimeter and 10,000 cycles per second were generated in water instead of in air. However, I have found that it is easier to generate compression waves in air with intensities of the order of one watt per square centimeter over a large area than it is to generate in water compression waves at one quarter watt per square centimeter over the same area. Consequently I am able to produce improved results even with liquid curtains having thicknesses as great as .100", at 10,000 C. P. S. or with thicker curtains at lower frequencies.

I have also found that where very thin curtains are impractical, the result obtained by compression wave treatment may be enhanced by using curtains having a thickness equal to a quarter of the wave length, in the curtain liquid, of the compression waves being employed, or a multiple of a quarter wave length. In such cases standing waves are then set up in the curtain itself which combine with the waves received from the gaseous medium to increase the acceleration of the particles enormously. For example, when compression waves at 10,000 cycles per second of an intensity of one watt per square centimeter are directed against a curtain of water 1.44" thick, the particle acceleration within the curtain reaches several thousand G., largely due to the standing waves set up in the curtain; the acceleration of the water particles in the absence of the standing waves would be only about 10 G. However, the thin curtains first described are generally preferable, since with the quarter wave length curtains, slight variations in curtain thickness, compression wave frequency, or the angle of incidence of the compression waves will cause very large variations in the peak acceleration of the particles.

The foregoing discussion has neglected the increase in efficiency obtainable by interposing reflecting surfaces to cause the waves to travel many times through the curtain. Multiple reflection of the compression waves in accordance with my invention may increase the effective intensity thereof as much as ten times or more, with the result that the acceleration of particles in a curtain .025" thick might be 8,000 G. instead of 800 G. An apparatus in which this desirable result may be accomplished is diagrammatically shown in Figure 1. There is provided a conduit 12 through which compression waves are introduced to the interior of a toroidal chamber provided in its bottom wall with a conical projection 10 lying in the same axis as the conduit 12. Around the top of the chamber is an annular inlet 16 through which liquid is introduced into the chamber as a cylindrical curtain, the path of which is shown by the broken lines 20. In the bottom of the chamber there is an annular outlet 16 through which the treated liquid passes. The path of a point on a wave front is shown by the line 22, the direction being indicated at intervals by arrows and showing twenty-eight reflections within the chamber and twenty passages through the curtain 20. For a complete description of an acoustic treating chamber of the type shown in the figure I refer to my copending application for improvement in an Acoustic chamber, Serial No. 645,224, filed February 2, 1946.

As the frequency of the compression wave is decreased, the optimum curtain thickness increases. Thus under conditions where the optimum curtain thickness at 10,000 cycles per second is .0005", a decrease to 1,000 cycles increases the optimum thickness to .005". However, particle acceleration decreases with frequency. If the curtain thickness is left at .0005" and the intensity at one watt per square centimeter, the acceleration at 1,000 cycles is in the order of 4,000 G., in contrast to an acceleration of 40,000 G. at 10,000 cycles, but if the curtain thickness is .005" the acceleration is approximately 4,000 G. at either frequency. Other factors may influence the frequency to be employed. The nature, shape, and size of the particles, globules, or organisms to be acted upon and considerations of cavitation effects, local resonance, fatigue, and heating will effect the choice of frequency so that in some particular cases a frequency of, say 20,000 cycles may produce better results than compression waves at 1,000 cycles and vice versa.

Another factor to be considered is the pressure maintained on the gas through which the compression waves are transmitted to the curtain. The pressure at a given point traversed by the compression waves will vary sinusoidally about the average mean pressure as an axis, but the amplitude in either positive or negative direction cannot exceed the difference between zero and the mean average pressure. Consequently, by increasing the pressure of the entire system, the amplitude of the compression waves may be increased. Furthermore I have found that the optimum curtain thickness for any one frequency increases with the pressure of the gas through which the waves are transmitted.

I have also found that the acceleration of the particles in the curtain varies with the composition of the gaseous medium in the system. The acceleration produced, however, is at the same time a function of the curtain thickness. For example, with a curtain .025" thick and a frequency of 100,000 cycles per second, intensity of one watt per square centimeter, and other conditions as outlined above, the acceleration of the particles in the water curtain when the gaseous medium is air is about 800 G. With chlorine it is 1,000 G., and with helium it is 520 G. By reducing the curtain thickness to .005" and leaving the other conditions unchanged the acceleration increases to 4,000 G., 5,000 G., and 2,600 G. for air, chlorine and helium respectively. If the curtain thickness is reduced to .000005 (about the thickness of the film in a soap bubble) the figures become 400,000 G., 300,000 G., and 700,000 G. for air, chlorine and helium respectively. The reason for the tremendous increases in acceleration with a helium atmosphere is the fact that the weight of the curtain has been reduced to approximately the weight of a column of helium of the same area and a thickness of a quarter of the wavelength.

Although it would appear that the acceleration in a water curtain .025" thick cannot be increased merely by increasing the frequency above 1,000 cycles per second, it does not follow that higher frequencies are not desirable for other reasons. It may be that at higher frequencies the particles or globules in the curtain will agglomerate due to shadow casting effects which occur when a wave strikes a particle or globule lying in front of a similar particle or globule and the pressure on the first one is greater than that reaching the second. It may also be that with higher frequencies particles, globules, or micro-organisms in the curtain will be particularly susceptible to destruction. There are also cavitation effects obtained at critical frequencies which are useful in such processes. In addition there are special local heating effects which are obtained at relatively high frequencies. In other words, although the efficiency of the treating process is in most cases roughly a function of the acceleration obtainable, it is by no means the only factor to be taken into consideration. In fact there are many factors which combine to produce a given effect. They include:

1. The type of gas employed,
2. The pressure of the gas,
3. The temperature of the gas,
4. The temperature of the material,
5. The vapor pressure of the gas,
6. The number and direction of the paths followed by compression waves traversing the curtain,
7. The intensity of the waves,
8. The thickness of the curtain,
9. The frequency of the waves,
10. The range of frequency of the waves, and
11. The time within which the frequency is modulated from one limit of the selected range to the other.

It will be apparent that my invention is much broader than a specific treating process. It includes in its scope the totally new complete technique for treating fluent materials with compression waves to improve any one of the characteristics of a material.

In order to illustrate the application of the foregoing factors to a particular process I will discuss a specific example in which it is assumed that we have an aqueous solution containing *Proteus vulgaris* (the common baccillus of putrefaction) as well as *Rhizobium radicicola* (a nitrogen fixing organism). We will further assume that it is desired to destroy the *Proteus vulgaris* without injuring the *Rhizobium radicicola* and also without markedly modifying other characteristics of the solution. It might be supposed that certain harmful effects occur in the solution at 50° C. which do not occur at about 40° C. We will also suppose that the solution will be undesirably modified if exposed to oxygen or nitrogen.

Under the conditions as outlined above a suitable treatment might be set up as follows:

A. Helium will be employed for the gaseous medium inasmuch as oxygen or nitrogen are harmful to the solution.

B. The pressure employed for the gas will be atmospheric inasmuch as in this particular case treatment at increased or reduced pressures produces no particularly desirable results.

C. The temperature of the gas and of the material will be 40° C. for the reasons above outlined.

D. The vapor content of the gas need not be controlled because changes in humidity or vapor content have no appreciable effect in this case.

E. The compression waves should strike the curtain over a wide range of angles, as obtained in a chamber of the type shown in the figure because the *Proteus vulgaris* should be subjected to compression waves at an angle at which destruction is stimulated at the frequency to be used.

F. The intensity of the waves should be about ½ watt per square centimeter because this intensity is sufficient to disrupt the *Proteus vulgaris* at 40° C. and still not destroy the *Rhizobium radicicola*.

G. The thickness of the curtain should be about .050" because at this thickness a sufficiently large quantity of the solution may be treated per hour and the curtain is still thin enough to react favorably at an intensity of ½ watt per square centimeter.

H. The frequency in this case will be 50,000 C. P. S. because disruption of the *Proteus vulgaris* is obtained at this frequency, but the *Rhizobium radicicola* is not significantly affected at 50,000 C. P. S.

I. The frequency will not be varied, because greater effect will be had by maintaining the frequency at the lethal frequency of the *Proteus vulgaris*. It therefore follows that there will be no cycling across a frequency range.

It will of course be understood that the above example is merely illustrative of one of a host of different treating processes embraced within the scope of my invention. In other applications it will be found desirable to establish special control of pressure, vapor content of the gas, and frequency modulation. It just happens that in the example given these factors are not controlling or of importance.

In cases where emulsification or the mixture of two liquids is desired I find it convenient to flow the separate liquids together to form a laminated curtain. The number of liquids which may thus be simultaneously treated is not limited: each of the liquids will form one of the laminations in the curtain. The thickness of the laminations will depend upon the results desired. That is to say, the thickness of the laminations will depend roughly upon the proportions of the desired mixture.

Having thus disclosed my invention, what I claim as new and desire to secure by Letters Patent of the United States is:

1. The method of improving the characteristics of a fluent material which comprises generating sound waves in a gas contained in a chamber, forming the fluent material into a curtain thin enough to undulate in reaction to the sound waves, flowing the curtain through the chamber, and directing the sound waves against the curtain.

2. The method of improving the characteristics of a fluent material, which comprises generating sound waves in a gas contained in a chamber, continuously varying the frequency of the waves over a substantial range of frequencies, forming the fluent material into a curtain thin enough to undulate in reaction to the sound waves, flowing the curtain through the chamber, and directing the sound waves against the curtain.

3. The method of treating a plurality of fluent materials, comprising generating sound waves in a gas contained in a chamber, forming the fluent materials into a thin laminar curtain thin enough to undulate in reaction to the sound waves, each fluent material comprising one lamina of the curtain, flowing the curtain through the chamber, and directing the sound waves against the curtain.

4. The method of improving the characteristics of a fluent material, which comprises generating sound waves at a predetermined frequency in a gas contained in a chamber, forming the fluent material into a curtain thin enough to undulate in reaction to the sound waves and having an average thickness approximately equal to a multiple of one quarter of the wave length of the sound waves in the material at said predetermined frequency, flowing the curtain through the chamber, and directing the sound waves against the curtain.

5. The method of improving the characteristics of a fluent material, which comprises generating sound waves in a gas contained in a chamber, forming the fluent material into a curtain thin enough to undulate in reaction to the sound waves, flowing the curtain through the chamber, directing the sound waves against the curtain, and maintaining the interior of the chamber at more than atmospheric pressure.

6. The method of treating a plurality of fluent materials, comprising generating sound waves in a gas contained in a chamber, continuously varying the frequency of the sound waves over a substantial range of frequencies, forming the fluent materials into a thin laminar curtain thin enough to undulate in reaction to the sound waves, each fluent material forming one of the laminae of the curtain, flowing the curtain through the chamber, and directing the sound waves against the curtain.

7. The method of improving the characteristics of a fluent material, which comprises generating sound waves in a gas contained in a chamber, forming the fluent material into an unsupported curtain thin enough to undulate in reaction to the sound waves, flowing the curtain through the chamber, and directing the sound waves against the curtain.

CAPERTON B. HORSLEY.

REFERENCES CITED

The following references are of record in the file of this patent:

UNITED STATES PATENTS

| Number | Name | Date |
| --- | --- | --- |
| 924,284 | Smith | June 8, 1909 |
| 1,734,975 | Loomis et al. | Nov. 12, 1929 |
| 1,738,565 | Claypoole | Dec. 10, 1929 |
| 1,980,171 | Arny | Nov. 13, 1934 |
| 1,992,938 | Chambers et al. | Mar. 5, 1935 |
| 2,138,051 | Williams | Nov. 29, 1938 |
| 2,138,839 | Chambers | Dec. 6, 1938 |
| 2,143,099 | Wynn | Jan. 10, 1939 |
| 2,163,650 | Weaver | June 27, 1939 |
| 2,407,462 | Whiteley | Sept. 10, 1946 |

OTHER REFERENCES

Wood et al., The Physical and Biological Effects of High Frequency Sound Waves of Great Intensity. Article in the London, Edinburgh, and Dublin Phylosophical Magazine and Journal of Science, Sept. 1927, pages 417–436, 252–314.